(12) United States Patent
Vainio et al.

(10) Patent No.: US 11,874,115 B2
(45) Date of Patent: Jan. 16, 2024

(54) POSITIONING OF MOBILE OBJECT IN UNDERGROUND WORKSITE

(71) Applicant: SANDVIK MINING AND CONSTRUCTION OY, Tampere (FI)

(72) Inventors: Tuukka Vainio, Tampere (FI); Jussi Collin, Akaa (FI); Lauri Siivonen, Suinula (FI); Jussi Puura, Tampere (FI); Tomi Von Essen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 207 days.

(21) Appl. No.: 17/297,591

(22) PCT Filed: Nov. 28, 2019

(86) PCT No.: PCT/EP2019/082921
§ 371 (c)(1),
(2) Date: May 27, 2021

(87) PCT Pub. No.: WO2020/109473
PCT Pub. Date: Jun. 4, 2020

(65) Prior Publication Data
US 2022/0026215 A1   Jan. 27, 2022

(30) Foreign Application Priority Data
Nov. 30, 2018   (EP) .................................... 18209502

(51) Int. Cl.
*G01C 21/16* (2006.01)
*G05D 1/00* (2006.01)
*G05D 1/02* (2020.01)

(52) U.S. Cl.
CPC ........... *G01C 21/16* (2013.01); *G05D 1/0088* (2013.01); *G05D 1/0212* (2013.01); *G05D 2201/021* (2013.01)

(58) Field of Classification Search
CPC ............. G01C 21/16; G05D 2201/021; G05D 1/0212; G05D 1/0088
USPC ....................................................... 701/500
See application file for complete search history.

(56) References Cited

U.S. PATENT DOCUMENTS

| | | | | |
|---|---|---|---|---|
| 7,069,124 B1 * | 6/2006 | Whittaker | ............ | G05D 1/0274 701/28 |
| 2006/0235609 A1 * | 10/2006 | Makela | .................. | G05D 1/024 701/1 |
| 2007/0027612 A1 * | 2/2007 | Barfoot | .................... | G08G 1/20 701/420 |

(Continued)

FOREIGN PATENT DOCUMENTS

| | | |
|---|---|---|
| JP | 2008185506 A | 8/2008 |
| WO | 2015106799 A1 | 7/2015 |

*Primary Examiner* — Yazan A Soofi
(74) *Attorney, Agent, or Firm* — Corinne R. Gorski

(57) ABSTRACT

A method for positioning a mobile object in an underground tunnel includes the steps of determining horizontal progression of a mobile object in an underground tunnel from a preceding position estimate or an initial position of the mobile object; determining horizontal position of the mobile object on the basis of a floor model of the tunnel and the estimated horizontal progression of the mobile object; and generating a three-dimensional position indicator on the basis of the horizontal position of the mobile object and a three-dimensional model of the tunnel.

11 Claims, 4 Drawing Sheets

(56) References Cited

U.S. PATENT DOCUMENTS

| | | | |
|---|---|---|---|
| 2015/0301533 A1* | 10/2015 | Preston | G05D 1/0212 |
| | | | 701/50 |
| 2016/0333691 A1* | 11/2016 | Puura | G05D 1/0274 |
| 2017/0234129 A1* | 8/2017 | Preston | E21D 9/108 |
| | | | 701/500 |
| 2018/0075643 A1* | 3/2018 | Sequeira | G01S 7/4808 |
| 2018/0216451 A1* | 8/2018 | Huikkola | E21B 44/08 |
| 2019/0383619 A1* | 12/2019 | Roper | G01B 7/004 |

\* cited by examiner

POSITIONING OF MOBILE OBJECT IN UNDERGROUND WORKSITE

RELATED APPLICATION DATA

This application is a § 371 National Stage Application of PCT International Application No. PCT/EP2019/082921 filed Nov. 28, 2019 claiming priority to EP 18209502.6 filed Nov. 30, 2018.

FIELD

The present invention relates to positioning of a mobile object in an underground worksite.

BACKGROUND

Underground worksites, such as hard rock or soft rock mines, typically comprise a variety of operation zones intended to be accessed by different types of mobile work machines, herein referred to as mobile vehicles. An underground mobile vehicle may be an unmanned, e.g. remotely controlled from a control room, or a manned mobile vehicle, i.e. operated by an operator sitting in a cabin of the mobile vehicle. Mobile vehicles operating in underground work sites may be autonomously operating, i.e. automated or semi-automated mobile vehicles, which in their normal operating mode operate independently without external control but which may be taken under external control at certain operation areas or conditions, such as during states of emergencies. Location tracking of mobile objects, such as mobile vehicles and persons is required at many worksites.

WO2015106799 discloses a system for scanning surroundings of a vehicle for producing data to determining position and orientation of the vehicle. The vehicle is provided with a reference point cloud data of the mine. The control unit is configured to match second point cloud data produced by a scanning device of the vehicle to the reference point cloud data in order to determine position data of the vehicle.

SUMMARY

The invention is defined by the features of the independent claims. Some specific embodiments are defined in the dependent claims.

According to a first aspect of the present invention, there is provided an apparatus, comprising: means for determining horizontal progression of a mobile object in an underground tunnel from a preceding position estimate or an initial position of the mobile object, determining horizontal position of the mobile object on the basis of a floor model of the tunnel and the estimated horizontal progression of the mobile object, and generating a three-dimensional position indicator on the basis of the horizontal position of the mobile object and a three-dimensional model of the tunnel.

In some embodiments, the means comprises at least one processor; and at least one memory including computer program code, the at least one memory and computer program code configured to, with the at least one processor, cause the performance of the apparatus.

According to a second aspect of the present invention, there is provided a method for mobile object positioning in underground worksite, comprising: determining horizontal progression of a mobile object in an underground tunnel from a preceding position estimate or an initial position of the mobile object, determining horizontal position of the mobile object on the basis of a floor model of the tunnel and the estimated horizontal progression of the mobile object, and generating a three-dimensional position indicator on the basis of the horizontal position of the mobile object and a three-dimensional model of the tunnel.

According to a third aspect, there is provided an apparatus comprising at least one processing core, at least one memory including computer program code, the at least one memory and the computer program code being configured to, with the at least one processing core, cause the apparatus at least to carry out the method or an embodiment of the method.

According to a fourth aspect, there is provided a computer program or a computer program storage medium comprising code for, when executed in a data processing apparatus, to cause the method of the second aspect or any embodiment thereof.

According to an embodiment of any of the aspects, the three-dimensional position indicator is generated on the basis of a sub-set of three-dimensional floor point locations within a threshold distance.

According to an embodiment of any of the aspects, the three-dimensional model comprises three-dimensional point cloud data generated on the basis of scanning the tunnel and the floor model comprises a sub-set of points extracted from the three-dimensional model.

According to an embodiment of any of the aspects, the mobile object is a vehicle, and the horizontal progression of the vehicle is determined on the basis of a dead reckoning algorithm configured to accumulate the vehicle's travelled distance and heading on the basis of an input signal indicative of vehicle wheel rotation and relative heading.

According to an embodiment of any of the aspects, proximity of the mobile object to a location reference unit is determined, and the position estimate is updated on the basis of location of the location reference unit and estimated distance of the mobile object to the location reference unit. For example, the location reference unit may be a wireless signal emission unit at a tunnel wall, a vehicle location tracking unit of a vehicle, or a pedestrian location tracking unit a carried by a pedestrian.

According to an embodiment of any of the aspects, the apparatus is a server or part of a control system configured to visualize the at least one monitored feature on at least one display device.

EMBODIMENTS

Figure 1:
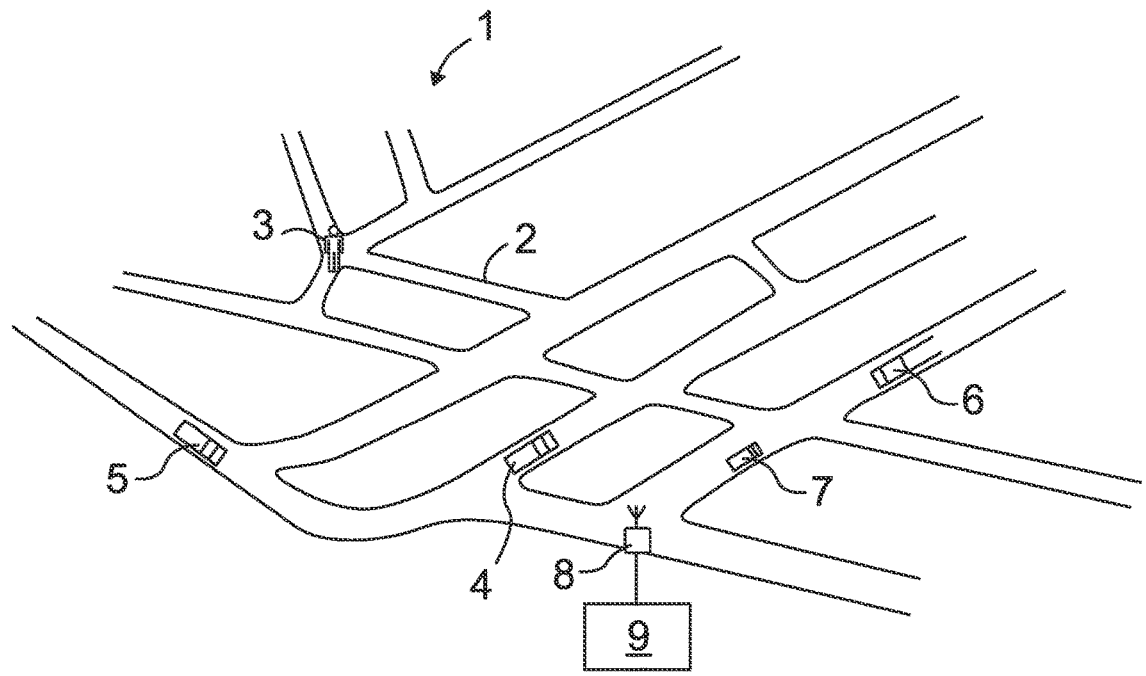
FIG. 1 illustrates an example of an underground work site.

FIG. 1 illustrates an underground worksite 1 comprising a network 2 of underground tunnels (illustrated without roof). A plurality of mobile objects, such as persons or pedestrians 3 and/or mobile vehicles 4, 5, 6, 7 may be present in and move between different areas or operation zones of the worksite 1.

The term underground worksite herein is intended to include a variety of underground worksites, including for example different kinds of underground excavation worksites, such as mines, roadwork sites, and railroad worksites. The term mobile object in this specification and claims is intended to include all mobile objects which may have an access into an operation zone of a worksite, such as mobile vehicles and human beings being at work in the worksite. The term mobile vehicle herein refers generally to mobile work machines suitable to be used in the operation of different kinds of underground mining or construction excavation worksites, such as lorries, dumpers, vans, mobile rock drilling or milling rigs, mobile reinforcement machines, and bucket loaders or other kind of mobile work machines which may be used in different kinds of excavation worksites. The mobile vehicles may be autonomously operating mobile vehicles, which herein refers to automated or semi-automated mobile vehicles.

The worksite 1 comprises a communications system, such as a wireless access system comprising a wireless local area network (WLAN), comprising a plurality of wireless access nodes 8. The access nodes 8 may communicate with wireless communications units comprised by the vehicles or carried by the pedestrians and with further communications devices 9, such as network device(s) configured to facilitate communications with an on-site (underground or above-ground) or remote control and/or monitoring system server.

The worksite 1 may further comprise various other entities not shown in FIG. 1, such as various system elements for power supply, ventilation, communications, and automation. For example, the worksite may comprise a passage control system comprising passage control units (PCU) separating operation zones, some of which may be for autonomously operating vehicles. The passage control system and associated PCUs may be configured to allow or prevent movement of one or more vehicles and/or pedestrians between zones.

Figure 2:
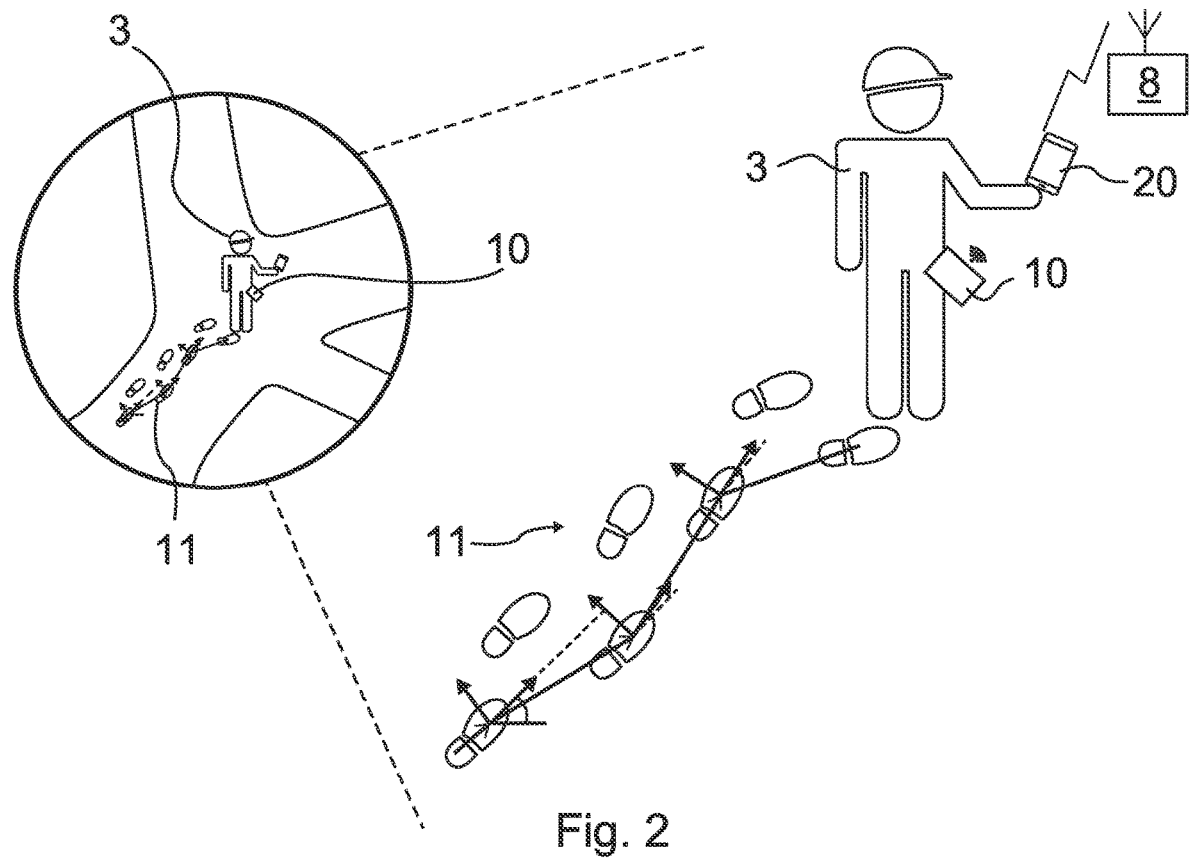
FIG. 2 illustrates pedestrian tracking in underground tunnel.

The mobile object 3-7 may comprise a sensor device configured to provide information of at least horizontal movement of the mobile object. With reference to the example of FIG. 2, a pedestrian 3 may be equipped with a sensor device 10 for movement tracking 11, such as a pedestrian dead reckoning (PDR) capable device, such as an inertial measurement unit (IMU). PDR refers generally to the process for determining the traveled distance of a pedestrian by counting steps based on accelerometer impacts, along with an estimate of the user's step length. In some embodiments, the PDR process may be configured to learn based on the movement of the mobile object and adapt the step length. The direction of travel, also known as heading, may also be included in the definition of dead reckoning, i.e. distance added with direction is combined to a displacement vector and those vectors are summed. The sensor device 10 may be connected to a mobile communications device 20, such as a personal mobile phone or other type of user device, configured to communicate with the access node 8. The sensor device 10 may also communicate with the access node 8 directly or by a proxy of another sensor device 10. It will be appreciated that the sensor device 10 and the mobile communications device 20 may be integrated as single device.

A problem with known PDR based methods is that they only work in 2D. In 3D environment the calculation would be complicated. There is now provided an improved system for tracking position of a mobile object.

Figure 3:
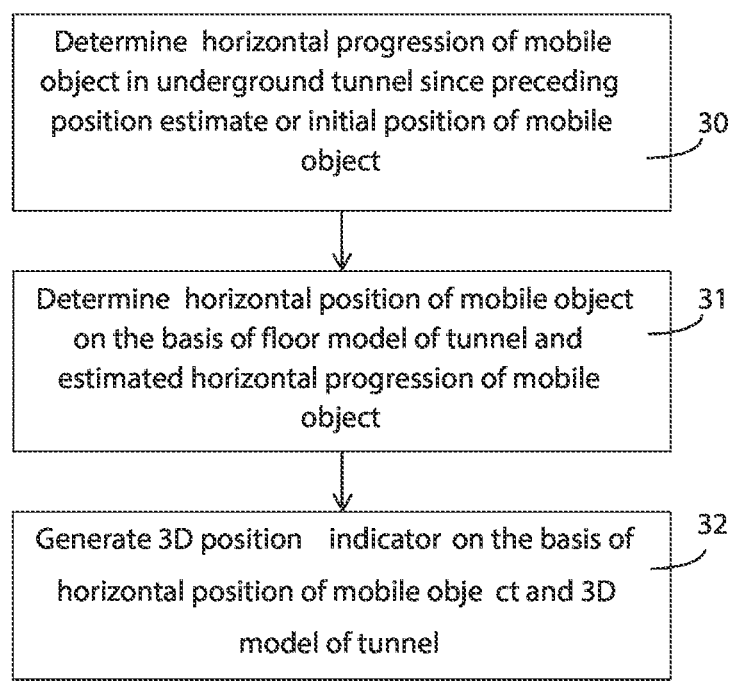
FIGS. 3 and 4 illustrate methods according to at least some embodiments.

FIG. 3 illustrates a method for mobile object positioning in an underground worksite. The method may be implemented by at least one device of a mobile object positioning system, such as a worksite server or other control device, a mobile unit such as a mobile communications device carried by the pedestrian 3 in the tunnel, or an vehicle on-board control device.

Horizontal progression of a mobile object in an underground tunnel from a preceding position estimate or an initial position of the mobile object is determined 30. In some embodiments, the horizontal progression is determined based on information received by a signal indicating length and direction changes by a sensor unit of the mobile unit, such as an IMU carried out by a pedestrian.

Horizontal position of the mobile object is determined 31 on the basis of a floor model of the tunnel and the estimated horizontal progression of the mobile object. A 3D position indicator is generated 32 on the basis of the horizontal position of the mobile object and a 3D model of the tunnel.

The 3D position indicator may refer to a data record comprising horizontal and vertical (x, y, z) position value stored in a memory and/or to a display indication. The term floor model refers generally to a model comprising a set of points indicative of the tunnel floor at least in horizontal plane, i.e. 2D or x, y coordinates. Such points may also be referred to as floor points. It is to be noted that the floor model may be in the form of a point cloud or mesh representation, for example. The floor model may be applied as a map for the mobile object movement tracking as presently disclosed, and the floor points may be considered as map points. The floor model may comprise also vertical plane, i.e. height or z coordinate data and/or supplementary data for at least some of the floor points. It is to be appreciated that the floor model does not necessarily define the absolutely lowest bottom level of the underground tunnel, but it may instead be more feasible to extract the floor model and floor points defining accessible areas at some height from the tunnel bottom. The floor model may include all points where it is possible for the tracked object to be, and exclude all locations where it is impossible for the object to be located. For example, a person can be located on the floor of the mine, but cannot be located inside the rock or walls of the mine.

The floor model may be automatically generated by detecting and extracting a sub-set of (floor) points from the 3D model of the tunnel. The extraction of the floor points may comprise calculating surface normal for each of points in a sub-set of points of the points defined in the 3D model, and selecting the floor points on the basis of e.g. the surface normal directions of the points in the sub-set of points of the 3D model.

The 3D model of the tunnel may comprise 3D point cloud data, which may be received as an output of scanning the tunnel by a surveyor or by a mining vehicle. In other embodiments, the 3D model may be or generated on the basis of a design model, such as a CAD model, created by a mine designing software or a 3D model created on the basis of tunnel lines and profiles designed in a drill and blast design software, such as iSURE®. Thus, mobile object movement tracking may be performed on the basis of the floor model comprising the extracted set of points of an initial 3D model of the tunnel environment.

It will be appreciated that FIG. 3 illustrates general features related to the underground mobile object position tracking and various additions and amendments may be applied, some further embodiments being illustrated below.

Figure 4:
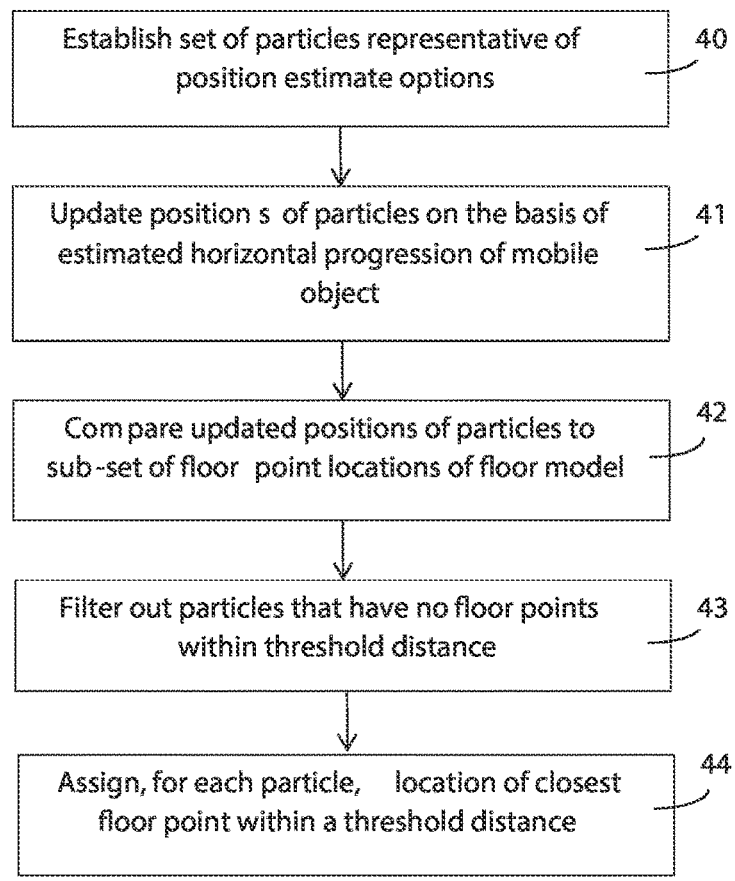

With reference to FIG. 4, in some embodiments block 31 is based on particle filtering and comprises:

establishing 40 a set of particles representative of position estimate options for the mobile object, the particles being associated with a position value, updating 41 the position of each of the particles on the basis of the estimated horizontal progression of the mobile object, and fusing the updated positions of the particles with the floor model.

In some embodiments, the fusing comprises blocks 42 to 44: In block 42 the updated positions of the particles are compared to a sub-set of the floor point locations. In block 43 particles that have no floor points within a threshold distance are filtered out. This indicates that the estimation has become impossible, for example object moved through a wall. In block 44 a location of a closest floor point within a threshold distance is assigned for each particle. It is to be noted that in case of 2D implementations, block 44 may be omitted.

All calculation for the particle movement may thus be carried out in 2D. The location estimate particles of the mobile object may be updated 41 only with horizontal direction estimate and movement (step or wheel rotation) length estimate.

In some embodiments, all particles have an initial location in 3D (x, y, z) and are based on the estimated horizontal progression moved to new locations in xy plane while the z plane/position remains unchanged. After all particles have been moved (in 2D), their updated positions are compared 42 to the positions of the floor model. For each particle in the set, a floor point closest to the respective particle is determined and the particle is moved to, or assigned with the closest floor point location, thus causing the particles to move along the floor model.

The 3D position indicator may be selected on the basis of (and among) a sub-set of 3D floor point locations within a threshold distance from a reference point, such as previous 3D position or the horizontal position defined in block 31. For example, the threshold distance may be set for z plane and floor points only close enough to the previous 3D position indicator's z plane position are considered. This reduces processing and enables limiting the search into a relevant sub-set of floor model data, thus also facilitating avoiding problems caused by overlapping tunnels.

According to some embodiments, the comparison in block 42 and/or 44 to the floor model is carried out in 3D, i.e. the particle locations are compared to the floor model points in horizontal and vertical planes. If no floor model points are at given 3D radius, the particle is considered to be outside of the floor model (and map) and is removed. By carrying out such map comparison in 3D the positioning system is capable to ensure both that the particle does not go out of tunnel in horizontal direction but does not also jump too much in height direction. If for example two tunnels go above each other, this prevents the particle from jumping from one tunnel to the other which would be problematic in case of 2D maps. The particle is moved to the closest map point making it move along the map in 3D while not jumping to above or below tunnels. A floor model or map matching algorithm may thus be applied, correcting the dead-reckoning based estimate by fitting the shape of the estimated trajectory to the shape of the areas defined accessible in 3D in the floor model.

Figure 5:
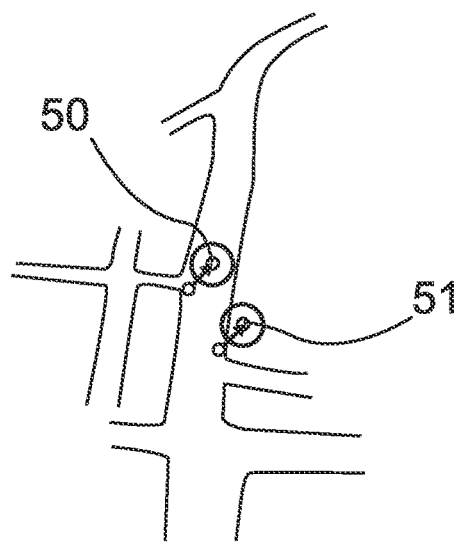
FIG. 5 illustrates particle map fusion.

In the example of FIG. 5, the updated position of the upper particle 50 is acceptable but the lower particle 51 goes outside of the floor model and must be removed as faulty.

The method thus uses the floor model of the underground space. The point cloud of the floor or road can be automatically extracted from a full 3D survey point cloud. Particle movement calculation may thus be simplified and done in 2D while the results are transferred to 3D. Such method may also be referred to as mobile object dead reckoning along a 3D map. The solution does not require for example altitude meters or similar additional sensors. It is adequate to equip the mobile object 3, 4-7 only with a sensor device capable for step detection or wheel rotation measurement with a relative heading estimate and optionally a length estimate in horizontal direction.

The presently disclosed features for mobile object location tracking hence facilitate less complicated calculations and thus faster position updating or reduce required computational resources. As compared to position update computation completely in a 3D environment, further error caused with vertical dimension calculation may be avoided. Further, since the floor model comprising the directly extracted set of initial 3D model points is applied, a special type of map need not to be generated and the features may be applied directly on point clouds or surface meshes with no special map generation or vectorization needed.

In some embodiments, proximity of the mobile object 3-7 to a location reference unit is detected. The horizontal position and/or the 3D position indicator of the mobile object may be updated on the basis of location of the location reference unit and estimated distance of the mobile object to the location reference unit. In some embodiments, the location reference unit is a mobile object, such as a sensor device carried by a pedestrian 3 or a vehicle positioning unit. The location of the reference unit may be received from the reference unit or a system maintaining up-to-date position information based on information from location reference unit(s). In some embodiments location information of a plurality of reference units is applied for updating the 3D position indicator.

The location reference unit may be a wireless signal emission unit at a tunnel wall, a mining vehicle location tracking unit of a mining vehicle 4-7, or a PDR or another position tracking unit a carried by a pedestrian 3. An RF tag, an access point, a visually readable code or another fixed unit the location of which is accurately known may serve as the location reference. Reference is also made to U.S. Pat. No. 7,899,599 disclosing that such identifier may be applied to update dead reckoning based location.

In some example embodiments, Bluetooth or Bluetooth Low Energy based communication is applied for the location reference unit detection and location. The 3D position indicator may be updated in response to detecting the mobile object 3-7 at (the proximity of) the fixed location reference unit. In another embodiment, the horizontal position obtained on the basis of dead reckoning or the particle states are updated based on the received location reference information.

For example, the mobile communications device 20 may be configured to monitor visible Bluetooth devices in the environment. Known beacons or vehicles may be detected based on the MAC address of the Bluetooth devices, while disregarding all other Bluetooth devices. This facilitates to initialize the location tracking or starting position for the mobile object on the basis of known beacon locations in access points to mine, initializing the location information in case of errors in strategic points in mine, detecting person to person interaction, detecting person to vehicle interaction, and/or resetting person's location to vehicle location in case person vehicle interaction is detected.

For example, a vehicle may report a detected Bluetooth address belonging to a person. Upon detecting that the person is very closely located to or at the same location as the vehicle, the person's location may be updated to correspond to the location of the vehicle. An additional status may be added for the person location information to indicate that the person is at vehicle with an identifier 'xxx'. Alternatively, the position of the mobile object may be updated on the basis of the reference unit position and estimated distance to the reference unit. The method may be applied to update location of all persons traveling in a car in the worksite as well as walking past vehicles.

In some embodiments, the mobile object is a pedestrian 3. The horizontal progression of the pedestrian may be estimated on the basis of a dead reckoning algorithm configured to accumulate the pedestrian's travelled distance and heading on the basis of an input signal indicative of pedestrian steps by an IMU. The IMU may be configured to perform processing of raw data from sensors and generate the signal indicating estimated travelled distance and heading change is sent to a location tracking unit, such as a server, carrying out the method of FIG. 3. For example, the signal may be transmitted at set time intervals of in response to detecting a step. A further implementation example applying PDR and a particle filter (PF) is provided below.

PDR is achieved by utilizing the kinematics of human gait. Typically the pedestrian's step count, step length and heading are estimated and, after that, dead reckoning algorithm is used to provide the current location of a pedestrian. The steps may be detected using the norm of accelerometer triad, a as $$a_{norm} = \sqrt{a_x^2 + a_y^2 + a_z^2} \quad (1)$$

where $a_x$, $a_y$, and $a_z$ are the components accelerometer triad. By detecting the cyclic pattern of the pedestrian signal, the travelled distance, rn can be calculated by accumulating estimated step displacement ΔS at each time instance n $$r_n = \sum_{i=1}^{n} \Delta S \quad (2)$$

Heading, i.e., yaw angle, Ψ, is estimated using gyroscopes and/or digital compasses (magnetometers). In order to calculate the heading, full 3-dimensional attitude of the IMU typically needs to be estimated. This can be done by using rotation matrices or quaternions, for example. When the attitude estimation is done, we can simplify the problem by writing that we have (virtual) gyroscope reading, ω, measuring the yaw angle. Thus, heading Ψ at time instant n can be estimated as $$\Psi_n = \Psi_{n-1} + \omega \Delta t, \quad (3)$$

where Δt is sampling interval.

There exist various different methods for step detection, including peak detection, zero-crossing, autocorrelation, fast Fourier transform. The position propagation in two dimension North-East-frame for PDR be written as $$N_{k+1} = N_k + \Delta S_k \cos(\Psi) \quad (4)$$

$$E_{k+1} = E_k + \Delta S_k \sin(\Psi) \quad (5)$$

where $E_k$ and $N_k$ are the East and North components, respectively, and $\Delta S_k$ is the estimated step length of the step k.

Because PDR is a relative position method, the initial position of the pedestrian must be also known by some means. For example, this may be done by integrating PDR with GNSS in outdoors and WLAN-based positioning in indoors where the initial or reference position can be acquired.

PF is applied to fuse the map information and the PDR output. Basic idea of the particle filter is based Monte Carlo simulation. This means that position solution distributions are presented as random samples. Each sample (i.e. in this case position) has also weight, which presents the likelihood of the sample. When the sample (position) is propagated using PDR method and position ends up going through wall or inside wall, the weight of the respective sample is decreased.

Instead of requiring describing the map as line segments, i.e. as vector map, point cloud model is used for the map of the underground tunnels. Each map point pi is presented as a 3-dimensional position in Cartesian coordinate frame $$pi = [xyz] \quad (6)$$

There are two main requirements for the map: Each map point pi should present only the floor points of the tunnel (i.e., areas where people are able to walk) and map points should be spaced with appropriate spacing, such as spacing selected in the range of 0.2 to 1 meter, in an embodiment approximately 0.5 meter spacing. For example, distance between points two closest points pi and pj should be at maximum 0.5 meters but smaller than 0.4 meters. The maximum and minimum values may be varied, but larger number of map points directly affects calculation time/computational load of algorithm.

The particle filter is implemented using following state vector x for each particle i $$x_i = \begin{bmatrix} p_x \\ p_y \\ p_z \\ \Psi \\ b \end{bmatrix}, \quad [7]$$

where $p_x$, $p_y$, and $p_y$ form the 3D position, Ψ is heading (direction of travel of a pedestrian) and b is bias of the gyroscope (or virtual gyroscope) measurement. In particle filter we also have a weights $w_i$ for particle i. There are two main points in the PDR particle filter:

1) Propagation phase, where the PDR equations (4, 5) are applied to propagate the states of each particle. For example, an attitude quaternion is received from the IMU with every step. Heading Ψ is extracted from the quaternion.
2) Update phase, where the states are updated. In the present example it is map update or Bluetooth beacon received signal strength update
   In map update we first find the closest point of the map and if the distance from the particle to this closest point is greater than certain threshold (e.g. 1.5 meters) then we set particle weight $w_i$ to zero (another update would be just to decrease the weight)
   In Bluetooth update received signal strength RSSI (measured in dBm) of Bluetooth beacons with known positions is applied. The following formula may be applied to change RSSI to distance d (in meters)

$$d = e^{-\frac{RSSI_{dBm}+40}{10}} \qquad [7]$$

If distance is to particle (from Bluetooth beacon) is smaller than d with respective $RSSI_{dBm}$, particle weight is untouched. However, if the distance is greater, the particles are moved or forced to be inside the distance. Also, there should be line of sight visibility between the particle and Bluetooth beacon. In addition to above two steps, the particle filter has also a resampling phase, which avoids degeneracy problem, where only a few of the particles will have a significant weight.

In some embodiments, the mobile object is a vehicle 4-7, and the horizontal progression of the vehicle is estimated on the basis of a dead reckoning algorithm configured to accumulate the vehicle's travelled distance and heading on the basis of an input signal indicative of vehicle wheel rotation and relative heading. The vehicle may comprise a positioning unit configured to perform at least some of the presently disclosed features. In another embodiment, a dead reckoning unit of the vehicle transmits a signal indicative of the estimated position to a server or another unit configured to perform at least the method of FIG. 3. It is to be appreciated that the system may comprise further operational modules supplementing dead reckoning based position tracking, such as a tyre slipping and/or wear compensation module. In an embodiment, a location tracking kit comprising the dead-reckoning unit is attachable to a vehicle when taking into use underground.

According to an embodiment, the vehicle 4-7 provided with a scanning device is serving as a mobile surveying device. The vehicle may execute the surveying continuously when carrying out dedicated normal operations of the vehicle. If the vehicle is a rock drilling rig or a reinforcing rig, it may scan the surroundings when it stops at a work site for executing drilling or feeding reinforcing elements or material. It may also be defined that the scanning is executed at least once each time when the vehicle is not moving. Thanks to this procedure, the mine may be surveyed repeatedly and in parallel to the normal operational process without any need for extra resources. The 3D model of the mine may thus be accurate and updated.

The vehicle 4-7 may be a semi-autonomous or autonomous vehicle and comprise a control unit with a collision prevention feature. The collision prevention system may prevent collision to surrounding surfaces such as rock walls. In addition, the collision prevention system may prevent collision to other vehicles, other booms, auxiliary devices, rock blocks, persons or any other physical objects which may be located close to the vehicle or are entering to the proximity.

The 3D position indicator may be applied in various ways, only some examples being illustrated herein. In some embodiments, the mobile object is displayed based on the 3D position indicator on a 3D map based on the 3D model. In some embodiments, the 3D position indicator is provided as an input for a collision avoidance system. This facilitates to prepare for a probable or possible collision risk beyond line of sight. In some embodiments, the 3D position indicator is provided as an input for updating position of other mobile object(s).

Figure 6:
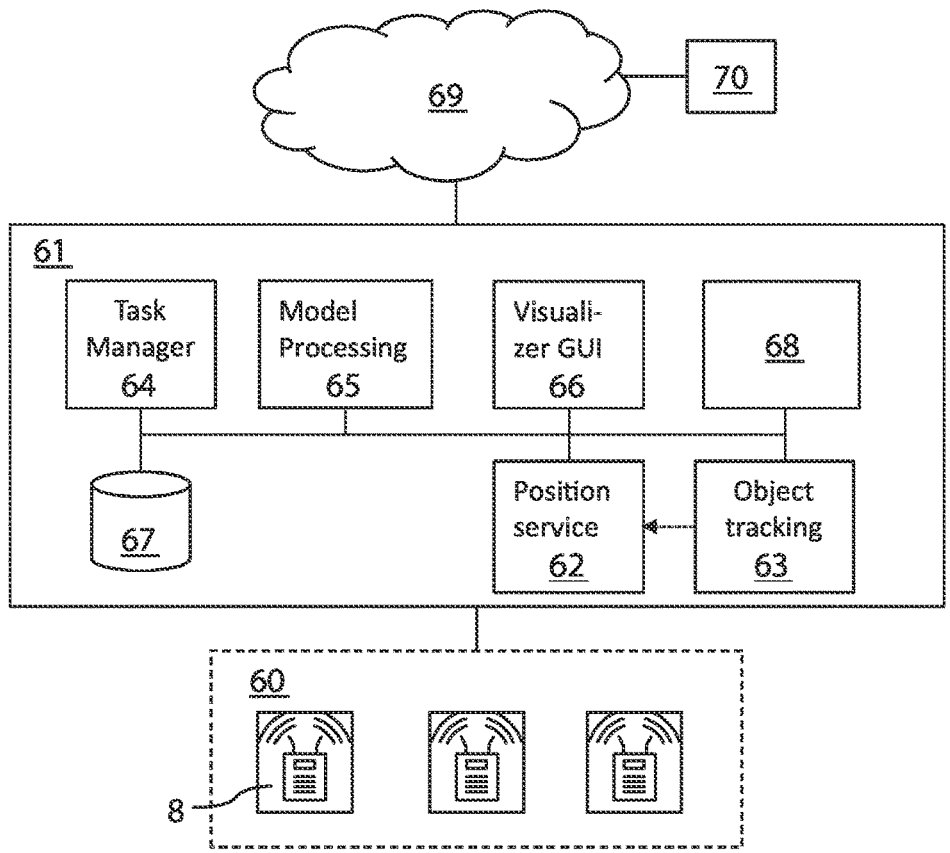
FIG. 6 illustrates an example system according to at least some embodiments.

FIG. 6 illustrates an example of a system for underground worksite. The system comprises a wireless access network 60 comprising a plurality of access nodes 8 for wireless communication with communication devices 10 of mobile objects 3-7 in the tunnels. The system comprises a server 61, which may comprise one or more above or underground computing units. The server 61 is configured to perform at least some of the above illustrated features related to mobile object positioning, such as the methods of FIGS. 3 and 4 on the basis of signals received from mobile object(s) via the access network 60.

FIG. 6 illustrates operational modules 62-68 of the server 61 according to some embodiments. An object tracking module 63 is configured to perform the method of FIG. 3 and provide the generated 3D position indicator to further modules, in some embodiments to a position service module 62.

The server 61 may comprise a task manager or management module 64, which is configured to manage at least some operations at the worksite. For example, the task manager may be configured to assign work tasks for a fleet of vehicles and update and/or monitor task performance and status, which is indicated at a task management GUI.

The server 61 may comprise a model processing module 65, which may maintain one or more models of the underground worksite, such as the 3D model. In some embodiments, the model processing module 65 is configured to extract the floor model and store it to the database or storage 67.

The server 61 may comprise a visualizer GUI module 66, which is configured to generate at least some display views for an operator (locally and/or remotely). In some embodiments, the visualizer GUI module 66 is configured to generate, on the basis of the 3D model or floor model, a 3D (and/or 2D) view indicating the current position of the mobile object on the basis of the 3D indicator generated in block 32.

The server 61 may comprise further module(s) 68, such as a remote monitoring process and UI, and/or a cloud dispatcher component configured to provide selected worksite information, such as the mobile object position information to a cloud service.

The system and server 61 may be connected to a further system 70 and/or network 69, such a worksite management system, a cloud service, an intermediate communications network, such as the internet, etc. The system may further comprise or be connected to a further device or control unit, such as a handheld user unit, a vehicle unit, a worksite management device/system, a remote control and/or monitoring device/system, data analytics device/system, sensor system/device, etc.

The object tracking 63 may be implemented as part of another module, such as the position service module 62. The position service 62 is configured to provide, upon request or by push transmission, mobile object position information obtained from or generated on the basis of information from the object tracking 63 for relevant other modules or functions, such as the database 67, the visualizer graphical user interface 66, and/or remote units or systems 70 via one or more networks 69. In the example of FIG. 6 the modules are illustrated as inter-connected, but it is to be appreciated that not all modules need to be connectable.

The system may comprise or be connected to a vehicle control unit or module provided with the 3D position indicator. The vehicle control unit may be provided in each autonomously operating vehicle and be configured to control at least some autonomous operations of the vehicle on the basis of their 3D location indicators. For example, in response to detecting a person to enter a zone comprising an autonomously operating vehicle, the control unit may be configured to send a control command to stop the vehicle.

An electronic device comprising electronic circuitries may be an apparatus for realizing at least some embodiments of the present invention, such as the main operations illustrated in connection with FIG. 3. The apparatus may be comprised in at least one computing device connected to or integrated into a control system which may be part of a worksite control or automation system.

Figure 7:
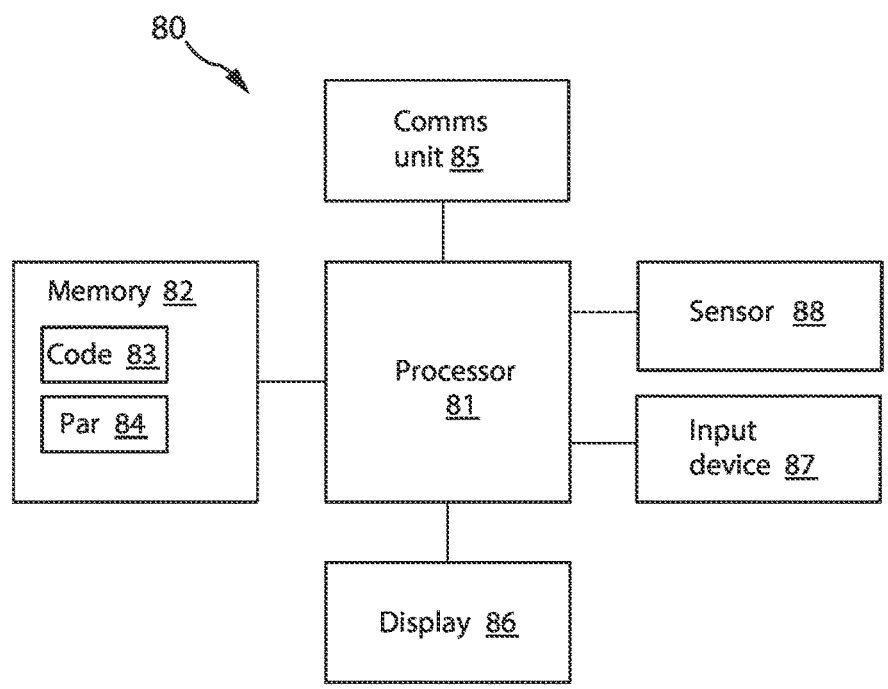
FIG. 7 illustrate an apparatus capable of supporting at least some embodiments.

FIG. 7 illustrates an example apparatus capable of supporting at least some embodiments of the present invention. Illustrated is a device 80, which may be configured to carry out at least some of the embodiments relating to the mobile object position tracking illustrated above. In some embodiments, the device 80 comprises or implements the server 61 and/or the object tracking module 63 of FIG. 6. In another embodiment, the device is comprised or carried by the mobile object 3-7, such as a mobile communications device or a vehicle control unit, configured to carry out at least some of the embodiments relating to the mobile object position tracking illustrated above.

Comprised in the device 80 is a processor 81, which may comprise, for example, a single- or multi-core processor. The processor 81 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 80 may comprise memory 82. The memory may comprise random-access memory and/or permanent memory. The memory may be at least in part accessible to the processor 81. The memory may be at least in part comprised in the processor 81. The memory may be at least in part external to the device 80 but accessible to the device. The memory 82 may be means for storing information, such as parameters 84 affecting operations of the device. The parameter information in particular may comprise parameter information affecting the mobile object positioning, such as threshold values and timing parameters.

The memory 82 may comprise computer program code 83 including computer instructions that the processor 81 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 80 may comprise a communications unit 85 comprising a transmitter and/or a receiver. The transmitter and the receiver may be configured to transmit and receive, respectively, information in accordance with at least one cellular or non-cellular standard. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, Ethernet and/or worldwide interoperability for microwave access, WiMAX, standards, for example. The device 80 may comprise a near-field communication, NFC, transceiver. The NFC transceiver may support at least one NFC technology, such as NFC, Bluetooth, or similar technologies.

The device 80 may comprise or be connected to a UI. The UI may comprise at least one of a display 86, a speaker, an input device 87 such as a keyboard, a joystick, a touch-screen, and/or a microphone. The UI may be configured to display views on the basis of the worksite model(s) and the mobile object position indicators. A user may operate the device and control at least some features of a control system, such as the system illustrated in FIG. 6. In some embodiments, the user may control a vehicle 4-7 and/or the server via the UI, for example to change operation mode, change display views, modify parameters 84 in response to user authentication and adequate rights associated with the user, etc.

The device 80 may further comprise and/or be connected to further units, devices and systems, such as one or more sensor devices 88 sensing environment of the device 80. The sensor device may comprise an IMU or another type of sensor device configured to determine movements of a mobile object. For example, heading information may be obtained directly from an electronic compass.

The processor 81, the memory 82, the communications unit 85 and the UI may be interconnected by electrical leads internal to the device 80 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

INDUSTRIAL APPLICABILITY

At least some embodiments of the present invention find industrial application at least in underground mining.

| ACRONYMS LIST | |
|---|---|
| ASIC | Application-specific integrated circuit |
| CAD | Computer-aided design |
| FPGA | Field-programmable gate array |
| GNSS | Global navigation satellite system |
| GSM | Global system for mobile communication |
| GUI | Graphical user interface |
| IMU | Inertial measurement unit |
| LTE | Fong term evolution |
| MAC | Medium access control |
| NFC | Near-field communication |
| N-RAT | 3GPP new radio access technology |
| PDR | Pedestrian dead reckoning |
| UI | User interface |
| WCDMA | Wideband code division multiple access |
| WiMAX | Worldwide interoperability for microwave access |
| WLAN | Wireless local area network |

The invention claimed is:

1. An apparatus, comprising means for performing the steps of:
   determining a horizontal progression of a mobile object in an underground tunnel from a preceding position estimate or an initial position of the mobile object;
   determining a horizontal position of the mobile object on the basis of a floor model of the tunnel and an estimated horizontal progression of the mobile object; and
   generating a three-dimensional position indicator on the basis of the horizontal position of the mobile object and on the basis of a three-dimensional model of the tunnel, wherein the three-dimensional position indicator is generated on the basis of a sub-set of three-dimensional floor point locations within a threshold distance from the determined horizontal position, and the means are configured for performing the steps of:

establishing a set of particles representative of horizontal position options for the mobile object;

updating positions of the particles on the basis of the determined horizontal progression of the mobile object; and fusing the updated positions of the particles with the floor model, wherein the fusing comprises:

comparing the updated positions of the particles to a sub-set of floor point positions of the floor model;

filtering out particles that have no floor points within a threshold distance; and assigning, for each particle, a position of a closest floor point within a threshold distance.

2. The apparatus of claim 1, wherein the mobile object is a pedestrian, and the horizontal progression of the pedestrian is determined on the basis of a dead reckoning algorithm configured to accumulate the pedestrian's travelled distance and heading on the basis of an input signal from an inertial measurement unit.

3. The apparatus of claim 2, wherein the apparatus is connected to or comprises a mobile user device including or being locally connectable to an inertial measurement unit wearable by the pedestrian.

4. The apparatus of claim 1, wherein the mobile object is a vehicle, and the horizontal progression of the vehicle is determined on the basis of a dead reckoning algorithm configured to accumulate the vehicle's travelled distance and heading on the basis of an input signal indicative of vehicle wheel rotation and relative heading.

5. The apparatus of claim 1, the apparatus being further configured for performing the steps of:

indicating, on the basis of the three-dimensional position indicator, the mobile object on a three-dimensional map based on the three-dimensional model; and/or providing the three-dimensional position indicator as an input for a collision prevention system.

6. The apparatus of claim 1, wherein the three-dimensional model includes three-dimensional point cloud data generated on the basis of scanning the tunnel and the floor model includes a sub-set of points extracted from the three-dimensional model.

7. The apparatus of claim 1, the apparatus being further configured for performing the steps of:

detecting proximity of the mobile object to a location reference unit; and updating a position estimate for the mobile object on the basis of location of the location reference unit and estimated distance of the mobile object to the location reference unit.

8. A method comprising the steps of:

determining horizontal progression of a mobile object in an underground tunnel from a preceding position estimate or an initial position of the mobile object;

determining a horizontal position of the mobile object on the basis of a floor model of the tunnel and the estimated horizontal progression of the mobile object; and generating a three-dimensional position indicator on the basis of the horizontal position of the mobile object and a three-dimensional model of the tunnel, wherein the three-dimensional position indicator is generated on the basis of a sub-set of three-dimensional floor point locations within a threshold distance from the determined horizontal position;

establishing a set of particles representative of horizontal position options;

updating positions of the particles on the basis of the determined horizontal progression of the mobile object; and fusing the updated positions of the particles with the floor model, wherein the fusing comprises the steps of:

comparing the updated positions of the particles to a sub-set of floor point positions of the floor model; and filtering out particles that have no floor points within a threshold distance.

9. The method of claim 8, wherein the mobile object is a pedestrian, and the horizontal progression of the pedestrian is estimated on the basis of a dead reckoning algorithm configured to accumulate the pedestrian's travelled distance and heading on the basis of an input signal indicative of pedestrian steps by an inertial measurement unit.

10. The method of claim 8, further comprising the steps of:

detecting proximity of the mobile object to a location reference unit; and updating a position estimate for the mobile object on the basis of location of the location reference unit and estimated distance of the mobile object to the location reference unit.

11. A computer program having computer executable code, which when executed in a data processing apparatus, performs the method in accordance with claim 8.

\* \* \* \* \*